United States Patent
Fortier

(10) Patent No.: US 7,200,223 B2
(45) Date of Patent: Apr. 3, 2007

(54) ELECTRONIC CIRCUIT TO REDUCE NOISE IN DIGITAL SUBSCRIBER LOOP AND COMMUNICATIONS OVER UNSHIELDED TWISTED PAIR METALLIC CONDUCTORS

(76) Inventor: John Fortier, 19 Hartfeld Dr., Rochester, NY (US) 14625

( * ) Notice: Subject to any disclaimer, the term of this patent is extended or adjusted under 35 U.S.C. 154(b) by 2 days.

(21) Appl. No.: 10/893,158

(22) Filed: Jul. 15, 2004

(65) Prior Publication Data
US 2005/0053227 A1 Mar. 10, 2005

Related U.S. Application Data

(60) Provisional application No. 60/530,814, filed on Dec. 18, 2003, provisional application No. 60/488,192, filed on Jul. 17, 2003.

(51) Int. Cl.
*H04M 1/738* (2006.01)
(52) U.S. Cl. .................. 379/416; 330/258; 324/625
(58) Field of Classification Search ............. 379/416; 330/258; 324/625
See application file for complete search history.

(56) References Cited

U.S. PATENT DOCUMENTS

| | | | |
|---|---|---|---|
| 4,387,277 A | 6/1983 | Gilles et al. | |
| 5,249,225 A | 9/1993 | Williams | |
| 5,602,912 A | 2/1997 | Hershbarger | |
| 5,859,564 A * | 1/1999 | Sonntag et al. | 330/258 |
| 6,681,012 B1 * | 1/2004 | Gorcea et al. | 379/402 |

FOREIGN PATENT DOCUMENTS

WO PCT/US04/22985 11/2004

OTHER PUBLICATIONS

"The Twisted-Pair Telephone Transmission Line", by Richard Lao of Sumida America Technologies, From Nov. 2002 High Frequency Electronics.
"Common mode voltage in telephone lines and its influence on measurements" by Rolands Parts, Lattlekom Testing Laboratory, Dzimavu iela 16, LV-1010, Latvia.
"Copper Lines and High Speed" by Peter Ziemann of Wandel & Goltermann GmbH, Germany.

* cited by examiner

*Primary Examiner*—Daniel Swerdlow
(74) *Attorney, Agent, or Firm*—Wilmer Cutler Pickering Hale and Dorr LLP

(57) ABSTRACT

In order to reduce noise in telecommunications made over unshielded twisted pair (UTP) of metallic conductors an active electronic circuit for a two-to-four wire hybrid circuit reduces common mode signals without recourse to inductive components. The hybrid has a balance network that dynamically alters its impedance to closely balance with the two wire line impedance. Residual common mode signals are cancelled. Resistors are connected to the wires and the circuit generates a high impedance to differential mode signals and a virtual ground to common mode signals.

2 Claims, 7 Drawing Sheets

FIG. 6  TWO TO FOUR WIRE HYBRID CIRCUIT

ELECTRONIC CIRCUIT TO REDUCE NOISE IN DIGITAL SUBSCRIBER LOOP AND COMMUNICATIONS OVER UNSHIELDED TWISTED PAIR METALLIC CONDUCTORS

BACKGROUND

This patent claims the priority of U.S. Provisional Patent Application Nos. 60/488,192 filed Jul. 17, 2003 and 60/530,814 filed Dec. 18, 2003, whose entire disclosures are herein incorporated by reference.

This invention is in the field of circuits for carrying high frequency, high bandwidth; broadband signals over twisted wire pair circuits, including the twisted pair wire circuits installed and used for carrying conventional voice telephone signals.

Broadband signals are generally described as those capable of carrying high capacity digital signals, usually between provider owned equipment at a central site and customer equipment in either home or office. These signals carry up to 8 megabits per second at present and are expected to carry up to 25 megabits per second in the near future. This digital signal is used to modulate an analog carrier signal, whose spectral bandwidth is normally, depending on the depth of modulation of the digital signal into the analog signal, a sub-multiple of the digital signal's bit rate.

Within their transmission medium, these signals are essentially a series of sine waves which may be modulated in one or more of amplitude, phase and/or frequency. The transmission medium is, for the most part, made up of twisted pairs of metallic wires gathered together into cables. Each pair is laid directly into the cable, without any metallic electrical shield between it and the surrounding pairs. These pairs are known as Unprotected Twisted Pairs (UTP). Each cable may contain any number of UTPs from 1 up to several hundred, although normal practice restricts the upper limit to 100 pairs.

Since such cables were originally designed, built and installed to carry voice frequency signals from a central telephone exchange to subscriber telephone instruments, they are not well suited to the carriage of broadband signals. Broadband signals will suffer from attenuation and the imposition of noise into the wanted signal.

However, even with severe attenuation of the wanted signal, as long as the signal to noise ratio remains sufficiently high, reception equipment will be able to extract the wanted digital signal. As the signal to noise ratio falls below an acceptable level, the number of received errors increases until the digital signal is essentially unrecoverable. It can be seen from this that noise is the limiting factor in the transmission of broadband digital signals over bundled UTP cables.

Several sources of noise affect the signals within the cable. The most influential of these include: Gaussian (thermal) noise, Crosstalk, Echo, Reflection, and External Noise. A short explanation of each of these follows.

Gaussian or thermal noise is generated by the random movement of particles within the conducting medium and is directly related to the temperature of the medium. Gaussian noise follows a non linear spectral power distribution, although for consideration of its effects on the relatively restricted spectrum of broadband signals, Gaussian noise generated within a cable has an essentially linear spectral power distribution. Gaussian noise is also generated within semiconductors and resistors within electronic circuits, where the temperature of the components is significant. Gaussian noise generated within cable pairs is generally of less significance than other types of noise described here.

Crosstalk is caused by the cross coupling of signals between pairs in the cable bundle. Since broadband signals are generally heavily modulated and encoded, these appear as effective noise in the receiving pair. While other factors play a part in the susceptibility of signals in pairs to crosstalk, generally, the effects of crosstalk increase with frequency, cable length and the number of broadband carrying pairs in the cable.

Echo occurs at the interface between the cable pair, in which signals must travel in both directions simultaneously, and the remainder of the circuitry, in which transmit and receive signals are separate, is known, for historical reasons, as a two wire to four wire hybrid. Perfect hybrid action is achieved when all transmit signals from the equipment are directed to the line, all signals received from the line are directed to the receive circuitry and no transmit signals are directed to the receiver. In any hybrid a balancing circuit is required which matches the line impedance. If this balancing network does not exactly match the line impedance, then part of the transmitted signal will be directed to the receiver where, since it interferes with the processing of the wanted receive signal, it appears, essentially, as noise.

Reflection is caused when the impedance of the two wire line and the impedance of the signal receiver do not match. Under these circumstances, part of the signal will reflect from the terminal junction. This has the effect of reducing the received power and causing standing waves in the wire pair where the reflected signal interferes with the incoming signal. Since the signal power has been reduced, it becomes more susceptible to other forms of noise. Simultaneously, the standing waves can cause amplitude and phase changes in the wanted incoming signal which appear as noise in the receiver.

External noise is electromagnetic in nature and may be caused by a number of sources. Examples are welding arcs, amateur radio transmissions, poorly suppressed car ignitions and lightening, although this short list is far from definitive. These sources propagate electromagnetic noise which, if the cable and noise source are in proximity, will be picked up by the cable, as a whole, and can, if of sufficient amplitude, cause the equipment connected to the line to stop working during the duration of the external interference or destroy the equipment. Also, due to the effect know as common mode to differential mode conversion, these external signals, even if not of sufficient amplitude to destroy or paralyze the connected equipment, will appear as noise within the wanted signal and severely degrade the ability of the receiving equipment to process the wanted signal.

Signals in the telephone line pass in both directions simultaneously. This is not so in the remainder of the system, where separate transmit and receive paths are used. These separate paths are required to allow the signal to be amplified, modulated, sent over fibre-optics, microwave radio, etc. all of which can only be carried out on a uni-directional signal.

At the point where the two wire line, where signals pass in both directions, meets the rest of the system, a circuit known as a two to four wire hybrid is used to ensure, as far as possible, that transmitted signals from the equipment are transmitted to the line and that signals received from the line are sent to the receive portion of the equipment.

FIG. 6 shows a hybrid/balance network where the impedance of the balance network balances the impedance of the line. If this balance is exact, then only the wanted signals as shown above will exist. However, if the balance is not exact, then part of the transmitted signal will cross the hybrid circuit and be sent back mixed with the signal received from line. In a DSL system, this partial transmit signal, mixed with the receive signal, will be perceived by the receiver as noise and will detract from the receiver's ability to decode and demodulate the received signal.

At present, in order to overcome this problem, which only exists in DSL systems because of the use of semi symmetrical transmission spectra, a system of echo canceling is used. In this, the digital equivalents of both the transmit and the receive signals are sampled, correlations are sought and any correlations found are cancelled. While that system is able to cancel echoes with present day equipment, working at present day data rates, it suffers from some shortcomings. First, it is complex and expensive, adds to cost and detracts from reliability. Second, it adds delay to the incoming signal, making the synchronization of the overall system more difficult. Thirdly, especially with digital systems such as high speed internet access, it has a tendency to cancel chance correlations with wanted receive data, which may occur from time to time.

As DSL speeds increase in future, the existing echo canceling systems will become less and less able to handle the high-speed data stream. The cost of the system will increase exponentially with data speed and may be a major stumbling block to the development of Very High Speed DSL (V-DSL).

Another problem that occurs at the two to four wire interface is the problem of matching the input of the hybrid to the impedance of the line. This should not be confused with the problem of echo in the hybrid, which is measured as trans-hybrid loss and in which a high figure is desired. Impedance mismatch at the hybrid to line junction gives rise to signals being partially reflected back into the line, reducing the amount of signal energy received from the line. In a system where any additional loss may make the difference between a working DSL link and one that is inoperative, the amount of mismatch can be significant.

It is possible to set the hybrid up to operate into a nominal line impedance, as supplied by the telephone company whose lines are to be used. However, no telephone line has the same impedance as any other telephone line and none of them are likely to conform to the nominal standard. Variations in impedance will be caused by length of line, diameter of the wires, the nature and thickness of the insulation around the wires and even such uncontrollable phenomena as the ambient temperature and the atmospheric pressure.

Under these circumstances, in systems where there exists the opportunity and the time to allow matching to any one line, the balance network will be manually adjusted to provide the maximum trans-hybrid loss and the best impedance match to the line. For systems, such as DSL, where a mass market exists and where there simply is no opportunity to make such adjustments and a nominal impedance and balance has been considered the best that could be hoped for.

Therefore, in present day systems, the use of echo canceling is mandatory and a junction impedance mismatch is the two to four wire junction is accepted as an inevitable and unsolved problem.

From all of the preceding information, it can be seen that the problems which currently beset Asymmetrical DSL have been caused by the presence of excessive far end cross talk at the higher frequencies of the downstream transmission spectrum. This cross talk is mainly caused by the common mode vector. From the presence of this crosstalk, and the piecemeal attempts to solve this problem, arise all the other problems that limit the capacity and competitiveness of DSL systems. However, no attempt seems to have been made to analyze the basic problems and the causes of crosstalk. This patent will undertake such an analysis, and show that the actual problem, once isolated, is amenable to treatment. It will also provide solutions to the problems that are presented. These solutions are in the form of circuits that may be added to existing telecommunication equipment, systems and networks to provide on or more means for greatly increasing the capacity of DSL systems.

SUMMARY

From the foregoing, it can be seen that the problems besetting DSL are almost all caused, in the first instance, by crosstalk and echo. This invention provides a solution to the problem that reduces crosstalk so that most of these problems will either disappear or be amenable to design changes that will in themselves solve the problems involved.

It has been shown that the common mode vector is essential to the transfer of crosstalk between wire pairs in a cable and that the presence of common mode chokes and transformers exacerbates this transfer. If a means can be found to effectively reduce common mode voltages on the wire pairs and to eliminate common mode standing waves, without affecting the wanted differential mode signals, then this will prevent the transfer of almost all crosstalk between pairs. Further, if trans-hybrid echo can be eliminated and a good impedance match to the line provided, the cost and complexity of the system can be reduced and its efficiency increased.

In order to address and solve these problems, the invention provides an Advanced Line Drive enhancer (ABLE). The ABLE eliminates the presence of common mode standing waves in the line and it greatly reduces the capability of the common mode vector to transfer signals between pairs. At the same time, the system will react to high voltage common mode events, caused by external influences and prevent them from reaching damaging amplitude. The overall design of the ABLE prevents external signals from interfering with the transmission of DSL signals during high voltage events, so there will no longer be interruptions to service. In order to achieve this end, the ABLE uses one or more circuits to isolated common mode signals on the transmitted signal and on the received signal. In general, the common mode signal is reduced or eliminated by generating an anti-phase common mode signal that is identical in all respects to the isolated common mode signal, except for phase. Then the isolated in phase and anti-phase common mode signals are added together and thus reduced or eliminated. Because the common mode signal may vary with frequency, the invention provides a dynamic adjustment that accounts for low and high frequencies.

Against this background and in accordance with several aspects of this invention, there is presented an electronic circuit with the following attributes:

The ability to reduce the presence of crosstalk in the multi pair cable connected to the invention and to reduce the effects of said crosstalk in the broadband signal receiver, The ability to severely reduce echo in the two to four wire hybrid associated with the invention and the associated broadband transmitter, The ability to severely reduce reflections occurring at the junction between the two wire line and the balanced to unbalanced working circuitry which forms the interface between the line and the aforementioned two to four wire hybrid, The ability to reduce the presence of Gaussian noise generated by electronic and resistive components in the associated broadband transmitter and The ability to reduce the ability of external signals to couple into the cable pairs and to reduce such residual interference as may couple in to the cable pairs.

These attributes are described in detail, each and severally, below.

DETAILED DESCRIPTION

Reducing Crosstalk

Before describing the action of the relevant parts of the invention, it is necessary to describe the physical means whereby signals are coupled between wire pairs within a multi pair cable.

Figure 8:
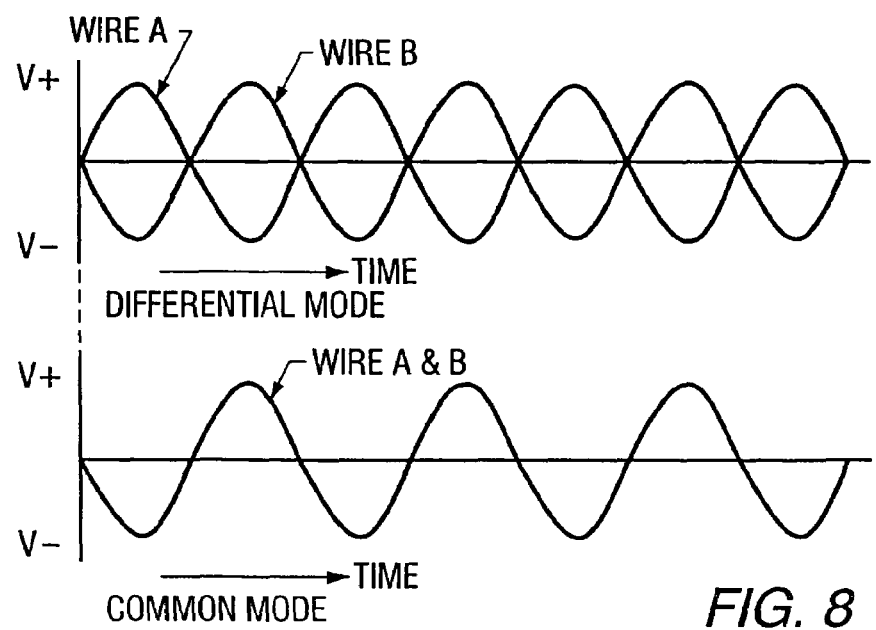
FIG. 8 is a graph showing differential and common mode signals.

Signals that are wanted are transmitted in differential mode (DM). In this mode, the currents and voltages in the wires of the pair travel in opposite directions to each other. If they are plotted against time they will look like the upper traces in FIG. 8.

The current flow in each wire is exactly equal and opposite to the current flow in the other wire. This is known as differential signaling or anti-phase, and the voltages developed in the wires will follow the same patter of rise and fall over time.

Currents in wires generate magnetic fields and these fields can affect the currents in other wires. However, if the two magnetic fields are equal and opposite and the wire is twisted, they will cancel each other over the length of a full twist. Considering that the wavelength of a signal of 1 MHz, near the maximum frequency is use in present day A-DSL, is, depending on the propagation velocity of the signal in the cable, between 300 and 500 meters, and that there are usually about four twists per meter, this provides excellent immunity to direct pair to pair signal transfer.

If the twist continues evenly over the length of the cable, then the differential signals in one wire pair will not affect signals in another pair. Cables are designed to provide this isolation and must meet stringent standards with regard to this.

It should also be borne in mind that the adjacent wire pairs are also twisted and, should a wire pair suffer from an imperfection which causes it to generate unbalanced magnetic fields, will be relatively impervious to interference from the originating wire pair.

Wires within a cable are twisted in a double helix in order to reduce the ability of signals to couple differentially into the conductors from outside the wire pair. Since the twists cause both wires in the pair to be exposed equally to external electromagnetic influences it becomes more difficult for these influences to couple differentially into each wire of the pair. If the twists of the wire pair are perfect from one end of the connection to the other, then the pair would be impervious to external influences.

However, taken as a whole, the wire pair will pick up external influences which will couple equally into both wires of the pair. This is common mode interference. Such interference can and will be converted to differential noise within the wire pair by imperfections in the wire pair.

At the same time, the twists in the pair ensure that the signal which is transmitted from one end of the pair remains as a differential signal, with equal but opposite voltages and currents occupying the wires. Such signals are wanted signals and are the signals which are degraded by the presence of differential noise in the wire pair.

Wire pairs in the real world cannot be perfect and some imperfections will occur. If such an imperfection affects both wires of the pair equally, then, while there will be a change in the impedance of the pair at the point of imperfection, it will not necessarily affect the signal balance or cause that point to become more susceptible to external electromagnetic influences. However, should the imperfection affect one wire more than the other, then the pair will become unbalanced at that point.

An unbalanced wire pair will convert part of the wanted differential signal to common mode signal and, at the same time, convert part of any common mode signal present in the wire pair into differential mode, where it will appear in the wire pair as differential noise. Therefore, any unbalanced imperfection in the wire pair will be a source of common mode signals and a source of differential mode noise.

Present practice when installing a broadband over UTP system is to terminate the twisted pair at each end with a transformer and/or a common mode choke. These appear as extremely high impedances to common mode signals. Therefore, common mode signals, once generated at a point of imperfection and transmitted from there into the cable, will reflect from the cable ends, travel to the far end of the cable, reflect from there and so on until they are so attenuated that they become insignificant compared to Gaussian noise. Every time one of these reflected signals passes a point of imperfection part of them will be reconverted to differential mode noise. At the same time, these reflected signals will appear as common mode standing waves in the pair as the reflected signal interferes with the incoming signal, exacerbating the reconversion of these signals to differential noise wherever a voltage maximum coincides with a point of imperfection, which will, generally speaking, be throughout the cable.

From this it can be seen that a signal in an imperfect twisted pair conductor can generate its own noise as it is converted to common mode, reflects and reconverts. The reconverted signal will be out of phase with and at different amplitude from the originating, wanted differential signal and will appear as noise with no correlation to the originating signal.

The common mode high impedance blocks at the wire pair ends have the effect of raising the common mode impedance of the wire pairs, particularly in shorter cables. Since the pairs in the cable are laid closely to each other and common mode signals exist commonly in both wires of each pair, the small capacitance which must exist between pairs in common mode is able, due to the high impedance of the common mode pair, to transfer significant electrical energy between pairs. In longer pairs, where transmission line effects are more prevalent, the standing waves generated by reflections from the line ends will appear as both current and voltage standing waves, allowing coupling via both inductive and capacitive means.

Thus, a wanted differential mode signal in one pair will be partially converted to a common mode signal at a point of imperfection, cross couple between wire pairs and will be reconverted to differential mode noise in all coupled wire pairs. This is the basis of most crosstalk in a multi-pair cable.

Cables and Wires

The modulated, data carrying, signal is sent between exchange and customer over standard telephone wires. Obviously, each wire pair cannot be individually strung between its end points and a significant infrastructure exists to provide these connections in a, relatively, structured and logical way.

Between the DSL Access Module (DSLAM) at the exchange building and the Customer Premises Equipment (CPE) the wire pairs are distributed via a series of cross connection points and multi pair cables.

Figure 7:
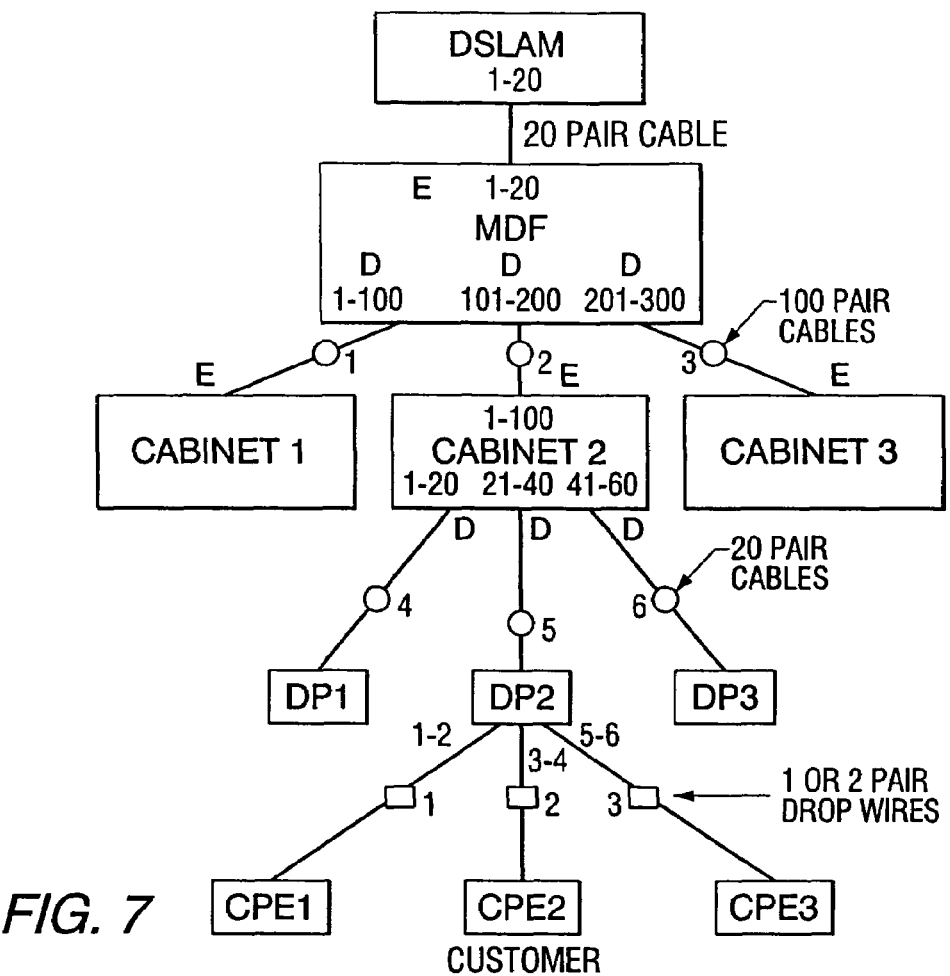
FIG. 7 is diagram of a telecommunication system with DSL access modules, distribution equipment and customer premises equipment.

These cross connect points are where the connections are made between cables, to guide the required signals between the DSLAM port and the customer's equipment, as shown in FIG. 7.

For example, in the above illustration, to connect DSLAM port 8 with the customer shown, pair 8 on the E (Equipment) side of the Main Distribution Frame (MDF) will e cross connected, via a wire pair in the frame, to pair 108 on the D (Down) side of the MDF. This will be connected to pair 8 of the cable 2. At the street cabinet, pair 8 of cable 2 will be cross connected to pair 8 of cable 5. At the Distribution Point (DP), pair 8 of cable 5 will be cross connected to pair 2 of Drop Wire 2, completing the circuit between DSLAM and Customer Premises Equipment (CPE).

The cables are made up of up to 200 wire pairs, twisted and then gathered together into a cable. The twists are to prevent, or reduce, the occurrence of crosstalk in the cable. If the twists were not present, the signals in the wire pairs would readily cross couple into adjacent wire pairs, causing overwhelming crosstalk. However, with twists in place, any cross coupling which occurs during one half twist is cancelled during the next half twist, resulting in an almost complete elimination of crosstalk.

Not only are the individual wires twisted, the pairs are laid into the cable in a manner which minimizes the possibility of cross coupling. The cables are sealed in a weatherproof outer sheath that holds the pairs in place. This sheath provides sufficient pressure on the wires to prevent them moving but not enough pressure to distort the lay of the pairs or the individual twists.

The Cross Connect points are made up of a framework of connection points, with an E side and a D Side. The connection points, in modern equipment, use insulation displacement connectors (IDC) to which the pairs of the cables are connected.

Connections between points on the E side to points on the D side are made by "jumper wires", which a technician will run across the frame to provide the connection.

In modern, well-maintained installations, these jumper wires will be laid neatly, with little slack and with right angle bends. While this greatly improves the management of the frame it also, unfortunately, contributes significantly to the generation of common mode signals, the main vector for crosstalk at DSL frequencies.

Much of the differential to common mode conversion will take place in the infrastructure associated with the transmitter/receiver equipment. This is normally located in a telephone exchange building, often referred to as a "central office". The equipment will be connected to a local distribution frame (LDF) by multi pair cables, cross connected at the LDF, connected to a main distribution frame (MDF) by multi pair cables and cross connected at the MDF so that the signals will be connected to the correct cable which will, via a further series of distribution nexi located between the central office and the customer, connect the signal to the customer's equipment.

All of these cross connections and relatively short cable runs entail sharp bends, squeezing of cables within cable trays and other imperfections which will tend to convert differential signals to common mode signals. Further, the signal transmitted from the broadband equipment will be strongest closest to the transmitter, that is, within the central office, so much of the generation of the strongest common mode signals will occur here. These common mode signals will be reflected from the high impedance common mode terminations within the broadband equipment and will propagate into the cable, where the close proximity of the wire pairs will cross connect them to other pairs.

Thus it can be seen that, in a multi pair cable with high impedance common mode terminations, differential to common mode conversion, cross coupling and common to differential mode conversion are the main contributor to cross talk.

Cross talk will increase with cable length, due to the increased number of points of imperfection and the greater length available for cross coupling, with the number of wire pairs carrying broadband signals within the wire pair, and with frequency due to the lower impedance of a capacitive coupling at higher frequencies. However, with fully reflective common mode terminals, standing waves from multiple sources (multiple points of imperfection), at multiple frequencies and at multiple amplitudes, will form in the line, apparently reducing the contribution of cable length to the overall crosstalk level. The contribution of reflected common mode signals from the cable ends is more prevalent toward the cable ends where such reflections are strongest, therefore, in shorter cables; this effect contributes more to the overall crosstalk phenomenon than it does in longer cables, where the reflected signals are attenuated within the cable length.

The amount by which the differential mode signal is attenuated by the conversion to common mode is known as Conversion Loss and is measured in dBv. (Measurement in power decibels is not possible since the actual impedance of the common mode line cannot be known). For a ten meter length of twisted pair wires, conversion loss has been measured in the neighborhood of 50 dBv at 1 MHz. Bear in mind, however, that the conversion loss is dependent on the length of the cable, the frequency of the signal and such characteristics as dielectric properties and wire composition and diameter. Therefore, 50 dBv should be considered a nominal figure.

This 50 dBv conversion loss also applies to conversions from common mode to differential mode, so the overall loss for conversion from differential mode to common mode and then to differential noise is 100 dBv for any one ten meter length of twisted pair of wires at 1 MHz. This will apply to any single wire, and shows that self interference, while not significant over short distances is actually present in any twisted pair conductor.

Real broadband signals exist in wires of up to 3 kilometers in length. Broadband signals may also extend up to 10 MHz, although present ADSL and SDSL transmissions rarely exceed 1.1 MHz.

Conversion loss increases by 6 dBv for each doubling of cable length, by 6 dBv for each doubling of the number of interferers in a cable and by a further 6 dBv for each doubling of frequency. These figures assume that the cable pairs under consideration are terminated in common mode high impedances, as is current standard practice.

The formula which describes crosstalk in cables where the common mode terminals are held at high impedance is therefore:—

$$CT = -100 + 20 \log(D/10) + 20 \log P + 20 \log F$$

Where CT=Crosstalk in dBv
D=distance in meters
P=the number of interfering pairs in the cable
F=Signal frequency in MHz This formula is a generalized formula and variations from this ideal can be expected with real cables. For example, where the cable is constructed to provide a better balance over the length of cable under consideration, the initial term can be adjusted in the negative sense to accommodate this variation. Further, the presence of high impedance common mode terminals to the wire pairs will affect the length contribution to this formula.

It follows from the above that to reduce crosstalk it is necessary to reduce the ability of the differential signal to translate into a common mode voltage signal and to reduce the ability of this common mode signal to capacitively cross couple between cable pairs.

Common Mode Voltage Controller

Figure 1:
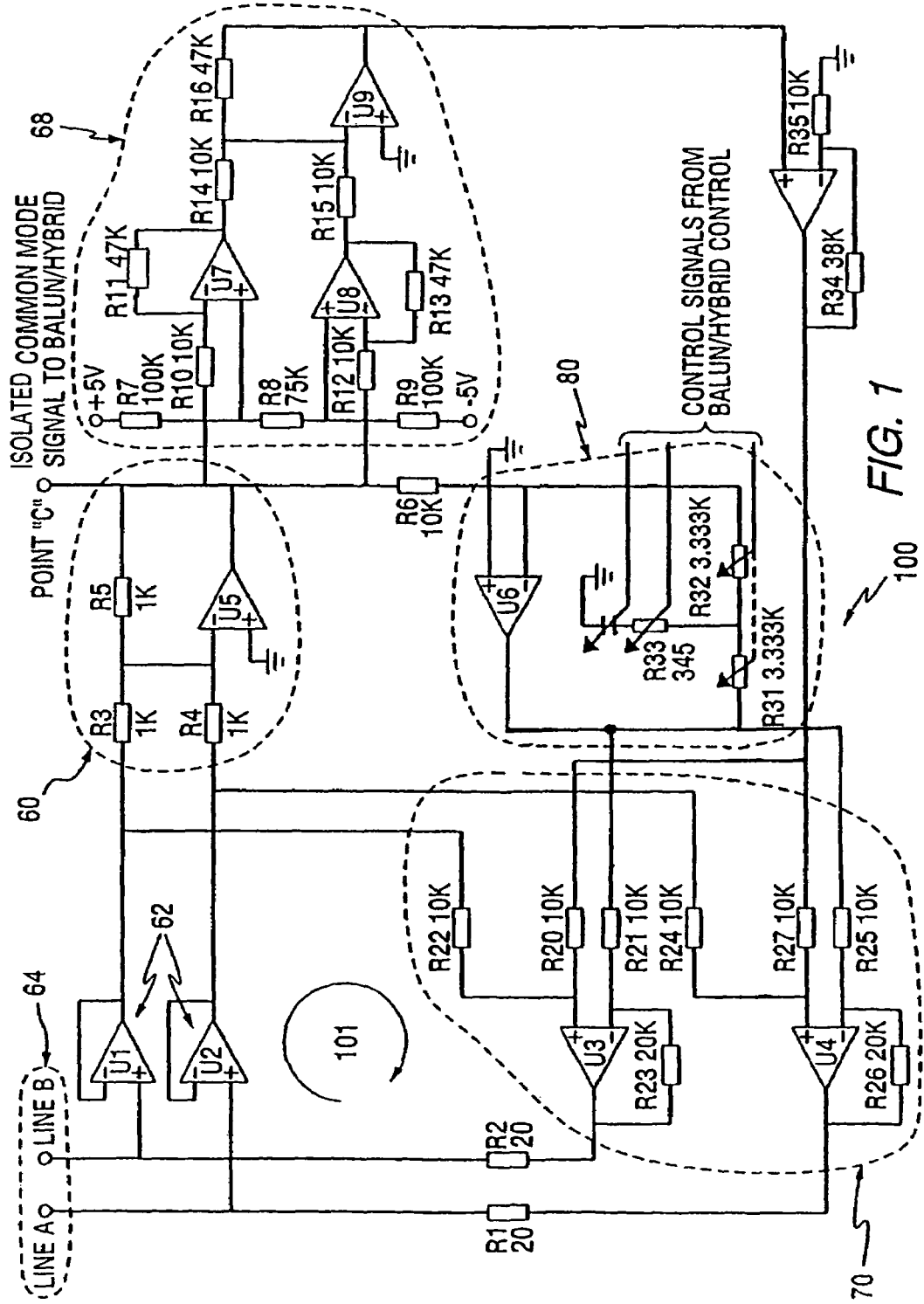
FIG. 1 is a schematic of a common mode voltage control circuit.

Turning to FIG. 1, there is an example of one circuit for a common mode voltage controller (CMVC) 100 that reduces both differential-to-common mode conversion and cross coupling of these common mode signals. Other embodiments are both possible and extant to those skilled in the art.

The purpose of CMVC 100 is to allow the free, unattenuated passage of differential mode signals within the two wire line while providing low voltage common mode signals with a matching impedance, thereby preventing reflections into the line, and higher voltage common mode signals with a progressively reducing impedance passage to a virtual earth. The instantaneous resistance of the circuit to earth being inversely proportional to the level of common mode voltage above a preset trigger voltage, maintaining the common mode voltage at a safe level for connected equipment.

Under normal, that is, low common mode voltage level conditions below the preset voltage trigger level, the circuit provides a line impedance matching resistance to a virtual earth for common mode signals, while maintaining a high resistance to earth for differential mode signals.

The circuit uses feedback circuitry to change the perceived impedance of a pair of resistors, R1 and R2, which are connected to the metallic wires of the twisted pair 64 as shown in FIG. 1.

R1 and R2 are, for example, 20 Ω resistors connected close to the twisted pair of wires 64. The other ends of these resistors are connected to the outputs of two unity gain, non-inverting, summing amplifiers, U4 and U3 respectively. Signals from the twisted pair 64, both differential and common mode, which develop over R1 and R2, are connected to network 62 via the inputs of two unity gain analogue buffers, U1 and U2, again respectively. The outputs of buffers U1 and U2 are connected to a network 70 via the inputs of the unity gain summing amplifiers, U3 and U4 respectively, such that the signals which appear at the outputs of the summing amplifiers U3, U4 are in phase with and at the same amplitude as the signals from which they originated in the twisted pair 64. This feedback loop shall be referred to as Loop 101.

Since the signals at both ends of R1 and R2 are in phase and have not been altered in amplitude, the voltages at each end of the resistors are identical and no current can flow through the resistors. Thus these resistors appear, without the action of the rest of the circuit, to be nearly infinite in resistance to all signals on the two wire line. The resistance seen by the incoming signals is that of the input to the buffers U1, U2, which is extremely high.

It should be noted, therefore, that to differential mode signals, the circuit 100 will simply appear as a very high impedance to earth (ground), which will not affect the transmission of differential signals within the twisted pair 64.

However, at the same time, the outputs of the buffers U1 and U2 are connected to the inverting summing amplifier U5 of network 60. Differential signals applied to this amplifier will be summed to zero, while common mode signals will be summed to their combined level. Thus, at the output of U5, differential signals have been eliminated, while common mode signals have been detected and isolated.

The common mode signals from the output of U5 are connected to the inverting input of U6, whose gain is determined by the associated feedback loop which determines the gain of the amplifier across the relevant frequency spectrum. The feedback loop 80 consists of a four element frequency sensitive attenuator, the low frequency response of which is set by the two series resistors, R31 and R32 while the high frequency response is set by the T attenuator formed by R31, R32 and R33. C1, the capacitor in the circuit, determines the pole at which the response changes between its low frequency and its high frequency response. The output, in phase with the line common mode signal, is applied to the inverting inputs of U4 and U3, from whose outputs it is then applied, in anti-phase, to the non line ends of R1 and R2 respectively. This anti-phase signal is set, by the action of the feedback loop 80 associated with U6, to a level where, when subtracted from the common mode signal in Loop 101, it will reduce the perceived resistance of R1 and R2 to an impedance at which the combined effects of line impedance matching and common mod current control result in a minimum level of crosstalk. This feedback loop shall be referred to as Loop 102 and includes networks 60, 62, 80 and 70.

While common mode voltages remain below a predetermined threshold voltage, the circuit 100 will present a high impedance to differential signals and a most effective impedance to common mode signals, thereby removing common mode reflections from the junction and common mode standing waves in the wire pair to which the circuit is attached and greatly reducing propagation of common mode signal into the attached wire pair. Common mode signals are absorbed by R1 and R2 and the virtual earths of U4 and U5, whose voltage level, determined with regard to common mode signals by the negative feedback through U6 are such that the common mode currents through R1 and R2 are such that reflection prevention and common mode current direction control provide a maximum reduction of common mode voltage in the line and the common mode crosstalk.

The output of U5 is also connected to threshold network 68 via the inverting inputs of U7 and U8, which together with U9 form a window discriminator. This, together with U10, will produce an output, with a gain of just over 100, whenever the common mode output of U5 exceeds a preset threshold. This signal, which will be in anti-phase to the line common mode signal, is applied to the non inverting inputs of U5 and U4, from where it is applied to the non line ends of R1 and R2 respectively. The discriminator is not required if the CMVC is used only to correct common mode on voice lines. It is only required for dual voice and DSL and for DSL-only lines.

The effect of this strongly amplified negative feedback signal on R1 and R2 is to reduce their apparent resistance as seen by common mode signals from the line. However, since only the common mode voltage which is exceeding the preset limit is causing this reduction in apparent resistance, the reduction of resistance perceived by the incoming common mode signal will only be sufficient to reduce the incoming signal to the threshold voltage.

Thus, the common mode impedance of the circuit does not reduce to zero. Even under high voltage interference events, the termination will still present a partially matched common mode impedance to the line, absorbing a significant portion of the common mode signal and keeping reflections and the resultant standing waves in the line to a minimum. As soon as the high voltage event ceases, the circuit returns to its previous impedance, immediately removing any standing waves which may have formed in the line. It should be noted that, during the high voltage interference event, the differential mode behavior of the circuit remains undisturbed, preventing interference to the wanted differential mode signal. The window voltage may be set to any voltage required. Point "C" connects to a hybrid circuit 200 as explained below.

Two-to-Four Wire Hybrid

A ⅔ hybrid circuit 200 provides high trans-hybrid loss into any normal telephone line. See FIG. 2. The circuit 200 will adjust to any complex line impedance between zero and infinity at frequencies from, for example, 100 Hz and extending to the highest frequency of interest in any particular instance of this invention.

Circuit adjustment is dynamic and automatic. The impedance behavior of a telephone line over the relevant frequency range varies from almost entirely resistive at the upper frequencies to extremely reactive at the lowest frequencies. The hybrid/balun circuit 200 is designed to match this varying and complex line impedance over all relevant frequencies and line impedances providing an extremely high four wire transmit to four wire receive loss.

The hybrid/balun 200 provides a balanced line output without the use of transformers. The hybrid/balun 200 reacts to alterations in the line impedance by precisely balancing the matching impedance to the line. How this is achieved is explained in the following sections.

Transmit Operation

Figure 2:
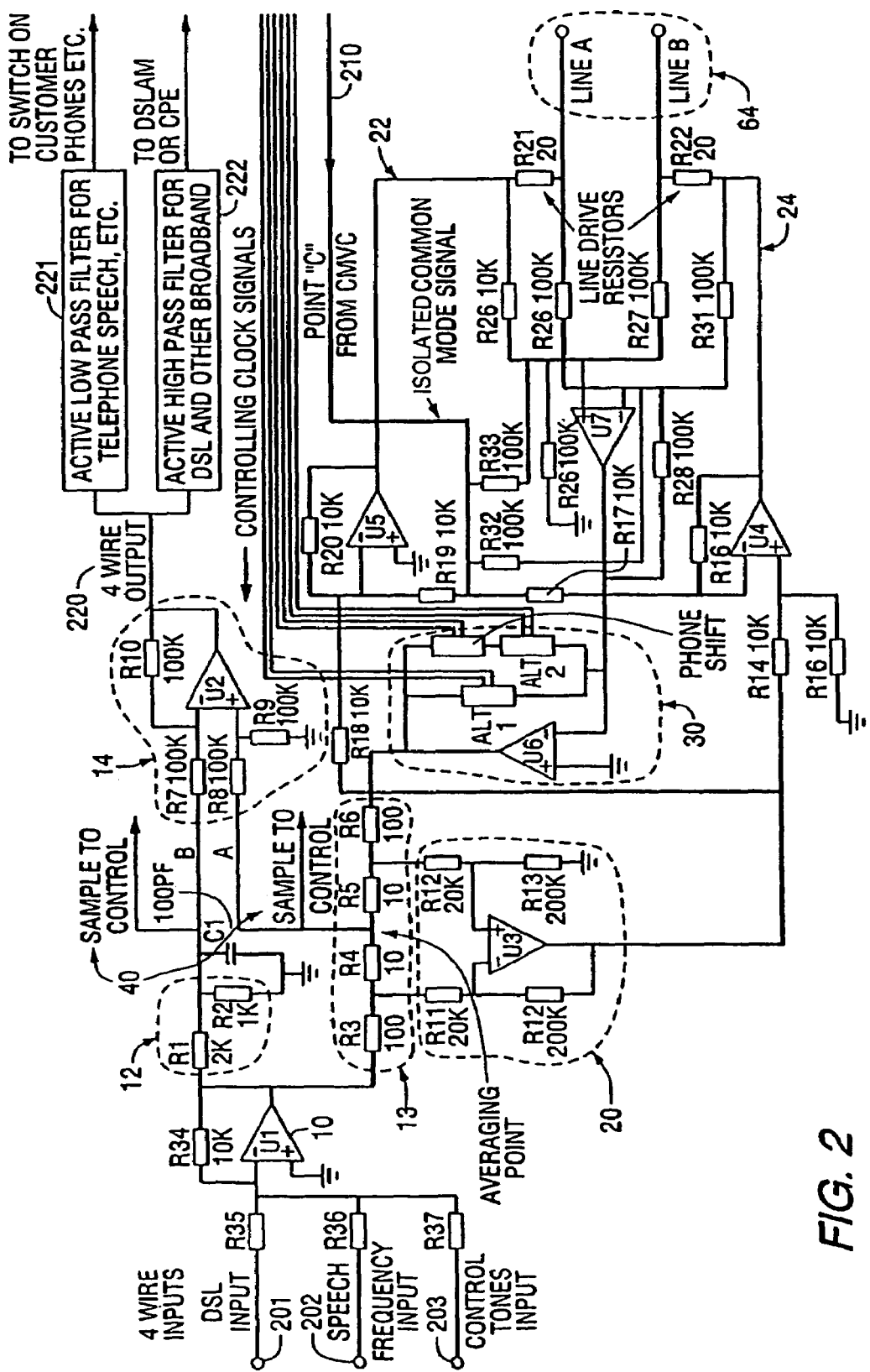
FIG. 2 is a schematic of a two-to-four wire hybrid circuit.

A circuit diagram of the Hybrid Section, Line Compensation Network and Impedance Matching Balun is shown In FIG. 2 by way of example of one manner in which this aspect of the invention may be realized. The circuit has to following features and functions:

(1) provides highly accurate hybrid action between the four wire circuit and the two wire line, (2) provides an induction free conversion between balanced working at the line interface and the four wire transmit and receive junction at point A, (3) matches the impedance of the line to the impedance seen to an incoming signal at line connected ends of resistors R21 and R22, and (4) prevents reception of residual common mode signals.

The point labeled "4 wire input" in FIG. 2 contains four different signals at different operational times. A broadband DSL or other broadband signal 201 is present during normal operation of the circuit. A speech frequency signal 202 is present during normal operation of the circuit where there is a legal or commercial need to provide a fallback speech circuit over the telephone line which is also carrying the DSL signal. A low frequency tone, normally only present during the period when the circuit is adjusting to two wire line conditions, is used to set the low frequency circuit behavior. A tone set to a frequency 204 which can be readily filtered from and which will not interfere with the lowest, in use, DSL frequency, is normally only present during the period when the circuit is adjusting to two wire line conditions, used to set the high frequency circuit behavior and the response pole during circuit setup following installation. Unless continuous hybrid to line matching is required, the two tones are cut off once hybrid and line impedance matching is achieved.

The circuit will balance if the two points, labeled A and B, have identical signals over the entire spectrum of interest.

The input signals are split into two following the output of U1. The signal following the upper path via R1 is attenuated by R1 and R2 to, for example, two thirds of the incoming signal level. This provides the reference signal against which the signal at Point A must be matched. The lower signal path is conducted via resistor chain R3 to R6 to the output of U8, a virtual earth (ground) to these signals. Point A lies between R4 and R5. Without the intervention of the rest of the circuitry, Point A would be at half of the incoming signal voltage level and the hybrid section would not balance at the output of U2, the four wire output. U2 is a differential amplifier whose output will be zero if the signals at points A and B are identical.

However, the rest of the circuitry is used to both transmit the signal to the two wire line having twisted pairs 64 and to balance the signal amplitude and phase at point A to that at point B, thereby achieving hybrid balance.

It is important to emphasize that the operation of the rest of the hybrid circuitry does not alter the gain or phase of either of the signal paths from the output of U1 to the inputs of U2. The effect of the circuitry is to add an in phase signal voltage to the signal passing through R3 to R6 such that the signal at Point A matches that at Point B.

The output of U1 causes current to flow through R3 to R6. The signal voltage will develop over these resistors. Ten percent of this voltage will develop over R4 and R5 and will be amplified by U3, a differential amplifier. With the component values shown in the example drawing, U3's output will be a signal at 50% the amplitude of the output of U1. The output of U3 is connected to the amplifiers formed by U4 and U5, a non-inverting and inverting unity gain amplifier, respectively.

The outputs of these amplifiers U4, U5 are conducted to Lines A, B, 64 via R15 and R16, two 20 Ω resistors. It should be noted that the use of these value resistors allows more power from the drive amplifiers to be sent to line. The output signal is balanced and at a level suitable for transmission over the line, nominally 20 dBm, set by the gain of the line drive amplifiers, here represented by U4 and U5.

R21, the UTP 64 and R22 form a signal divider network. The amplitude and phase of the voltages developed over R21 and R22 will be controlled by the line impedance at all relevant frequencies. Voltage over the drive resistors will be inversely proportional to the voltage developed over the line, with a similar response with regard to signal phase.

U7 is a transversal amplifier which will amplify the signals developed over R21 and R22. It follows that the output signal voltage of U7 is inversely proportional to the signal voltage developed over the line impedance at the relevant frequencies.

The output of U7 is connected to the input of the Line Compensation Network 30, comprising U8 and associated components. The purpose of this network is to provide a three element network which will have an exact reverse amplitude and phase response over the relevant spectrum to the R21, UTP 64 and R22 network, modifying the phase and amplitude of the signal over the relevant spectrum so that the signal level at point A is an exact replica of that at point B.

The output of U8 drives current through R6 to R3, in phase but in the opposite direction to that coming from U1. The voltages developed by these two opposing currents will average at point A, raising it to the necessary level.

Although the incoming and fed back signals are in phase, they are driven through R3 to R6 in opposite directions, thus the signal from U8 acts as negative feedback to the incoming signal reducing the output of U3, improving the higher frequency performance of the circuit and, most importantly, reducing the effects of variations in line impedance on Point A.

Line Compensation Network

The Line Compensation Network 30 is designed to make the overall response of the circuit linear, from the outputs of U5 and U4 to the output of U8. In order to achieve this, the frequency response curves, with regard to both amplitude and phase of the Line Compensation Network, must be such as to exactly compensate for the non linearity in the line. This is achieved by using a three element network in the feedback path of the inverting amplifier U8. The response of this feedback network is that required to linearize the line response.

However, since no UTP line is identical with regard to impedance over the spectrum of interest with any other line, it is necessary to dynamically adjust the values of the elements in the feedback network in order for them to accurately compensate for the frequency response of any connected two wire line. This is done, at initial connection to the line, by comparing the amplitude and phase variations between Points A and B at a low frequency and a higher frequency. Both these frequencies are chosen to avoid interference with either the speech band or the ADSL band. As an example, the lower may be set to 80 Hz while the higher may be set to 24 KHz.

In installations where it is not expected that the line impedance will change once the system is set up, the tones 203, 204 may be disabled once the equipment is fully matched to the line, locking the compensation network in the initial line match condition. If however, the line impedance can be expected to alter during the use of the line, the tones may remain operational, maintaining a match against a variable line impedance.

These tones are sampled at point A and Point B and are compared for amplitude and phase by the control circuitry. From this comparison, the control circuitry generates control signals which alter the amplitude and phase response of the elements in the compensation network until balance is achieved between Points A and B.

Effectively, the phase response of the feedback network controls the pole of the response curve of the feedback network. It might be thought from this that a third control tone would be necessary at the frequency of the pole. However, this is not so for three reasons:

(1) The pole of the line response varies from line to line, making an amplitude measurement to determine the feedback pole insufficiently accurate.

(2) Even if the amplitude of the response at the pole is correct, there will be a phase difference, which will affect the output of U8, reducing the trans hybrid loss significantly.

(3) The phase response curve of the line is considerably different to the amplitude response curve, and this can be used, at the higher tone frequency, to determine the capacitance required to generate the pole.

Thus, the low frequency tones relative amplitude sets the low frequency behavior of the feedback network by altering the attenuation of Attenuator 1, the relative amplitudes of the higher frequency tones set the high frequency behavior of the feedback network by altering the attenuation of Attenuator 2 and the frequency response slope is set by comparing the phases of the higher frequency tones found at points A and B and using the result to control the phase shift generated by the Phase Shift element.

The direction of the alteration of the values of the three element network is always that which will bring the differences between the sample points towards zero. The overall control circuit, therefore, comprises two amplitude locked loops and one phase locked loop, with the signal at point B being the reference signal and the signal at Point A being the variable signal.

Examination of FIG. 2 reveals that Attenuator 1 is in parallel with the other two elements. Attenuator 1 controls the low frequency behavior of the feedback network 30. It may also be noted that the connections between the elements are not identical to those normally seen in three element networks representing line impedances. However, a Kirchoff analysis of the network will reveal that its overall behavior is the same as the more common layout of a resistor in series followed by a capacitor and a resistor in parallel.

The advantage of this particular layout is that, since, for the three element network, the signal source is a low impedance voltage source and the signal sink is a virtual earth, there is no interference between the two paths within the three element network.

Therefore, the low frequency adjustments of Attenuator 1 will not affect the operation of the Phase Shift element and Attenuator 2, which are controlled by the higher frequency control tone.

Figure 5:
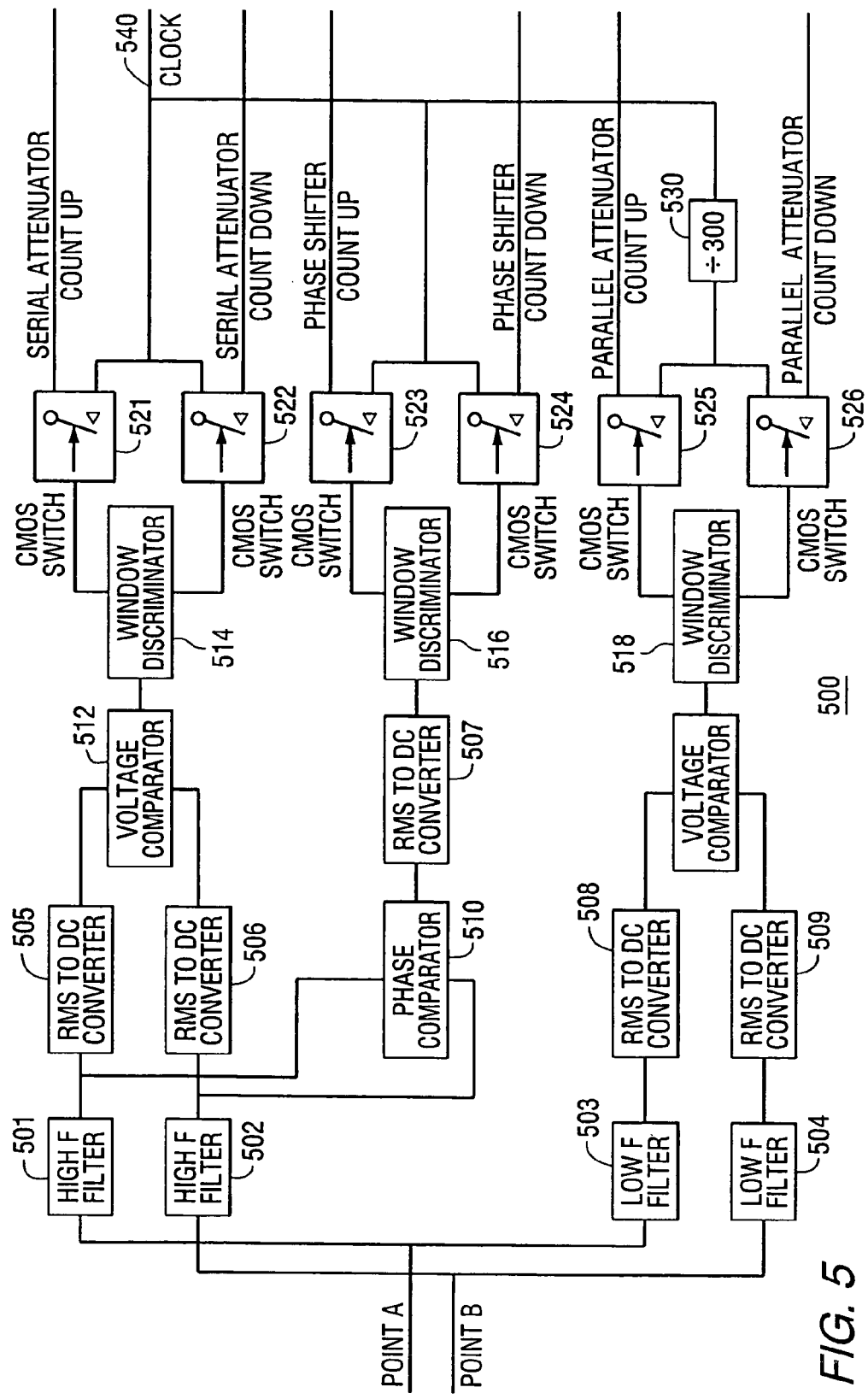
FIG. 5 is a schematic of a control circuit for the two-to-four wire hybrid circuit.
Figure 6:
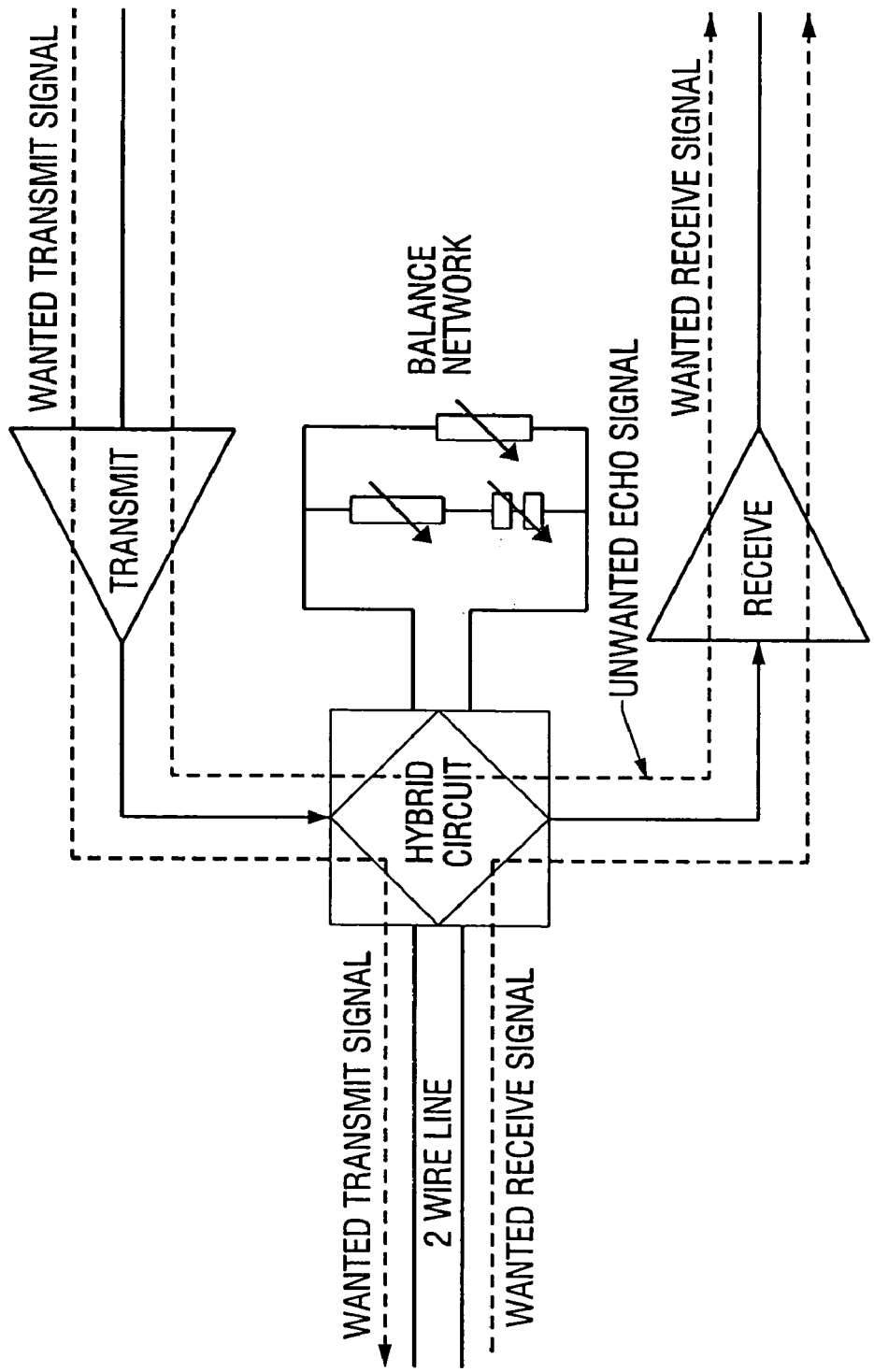
FIG. 6 is a schematic of a general hybrid circuit.

Since the low frequency behavior is generally independent of the high frequency behavior, causing only minor changes in the high frequency behavior of the circuit as it adjusts to a line's low frequency impedance, and because, due to the design of the Control Circuitry, FIG. 5, it adjusts to low frequency line conditions considerably more slowly than the higher frequency elements, the higher frequency elements are able to re-adjust easily while Attenuator 1 reaches its final value. This allows a stable adjustment of the overall circuit, without hunting and overshooting from the high frequency element adjusted values.

Digital Attenuators and Phase Response Circuits

Both Attenuators 1, 2 are identical Digital Attenuators 300. A Digital Attenuator and Phase Response Circuits are shown in FIGS. 3 and 4, respectively.

Figure 3:
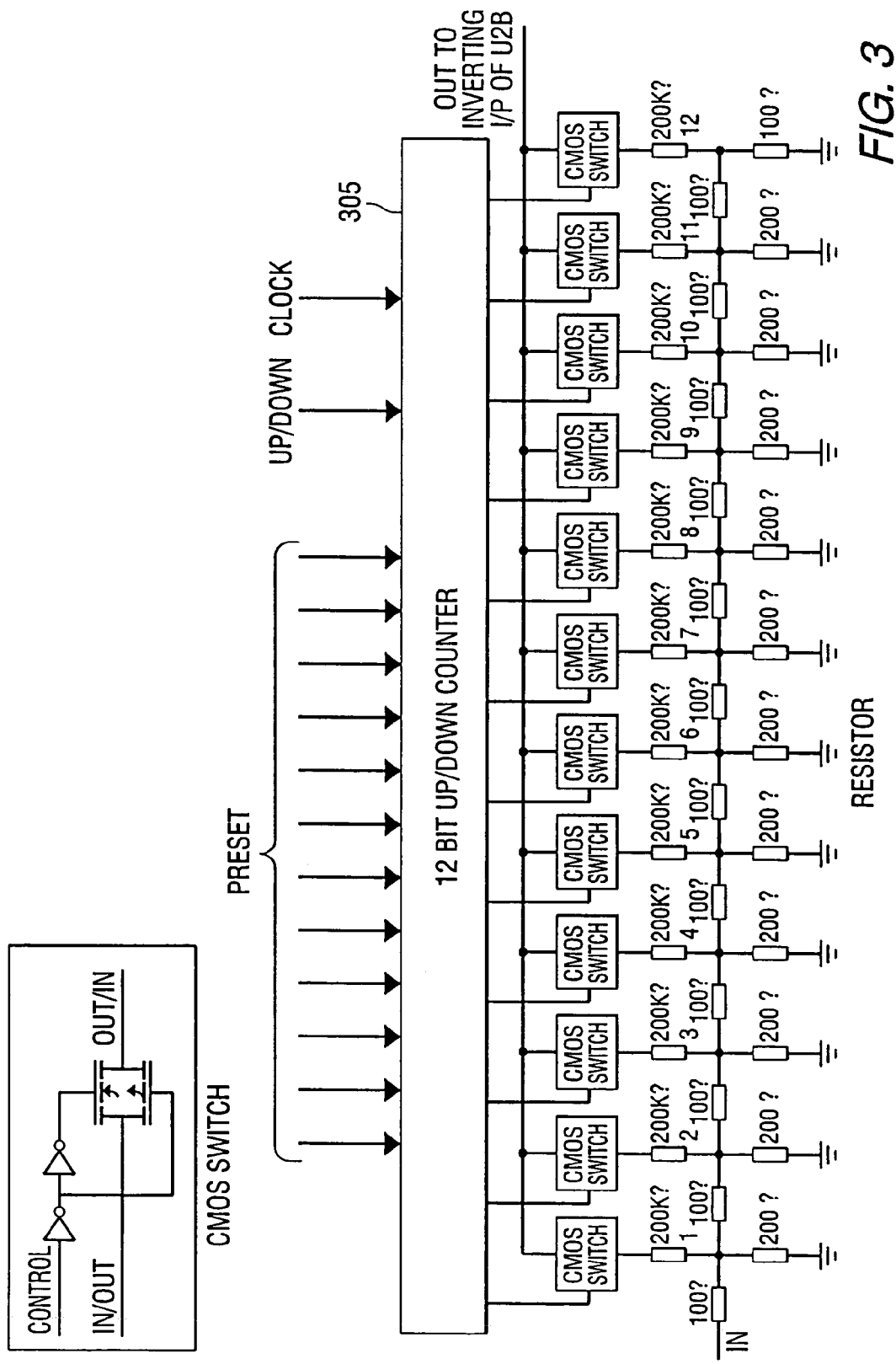
FIG. 3 is a schematic of a digital attenuator.
Figure 4:
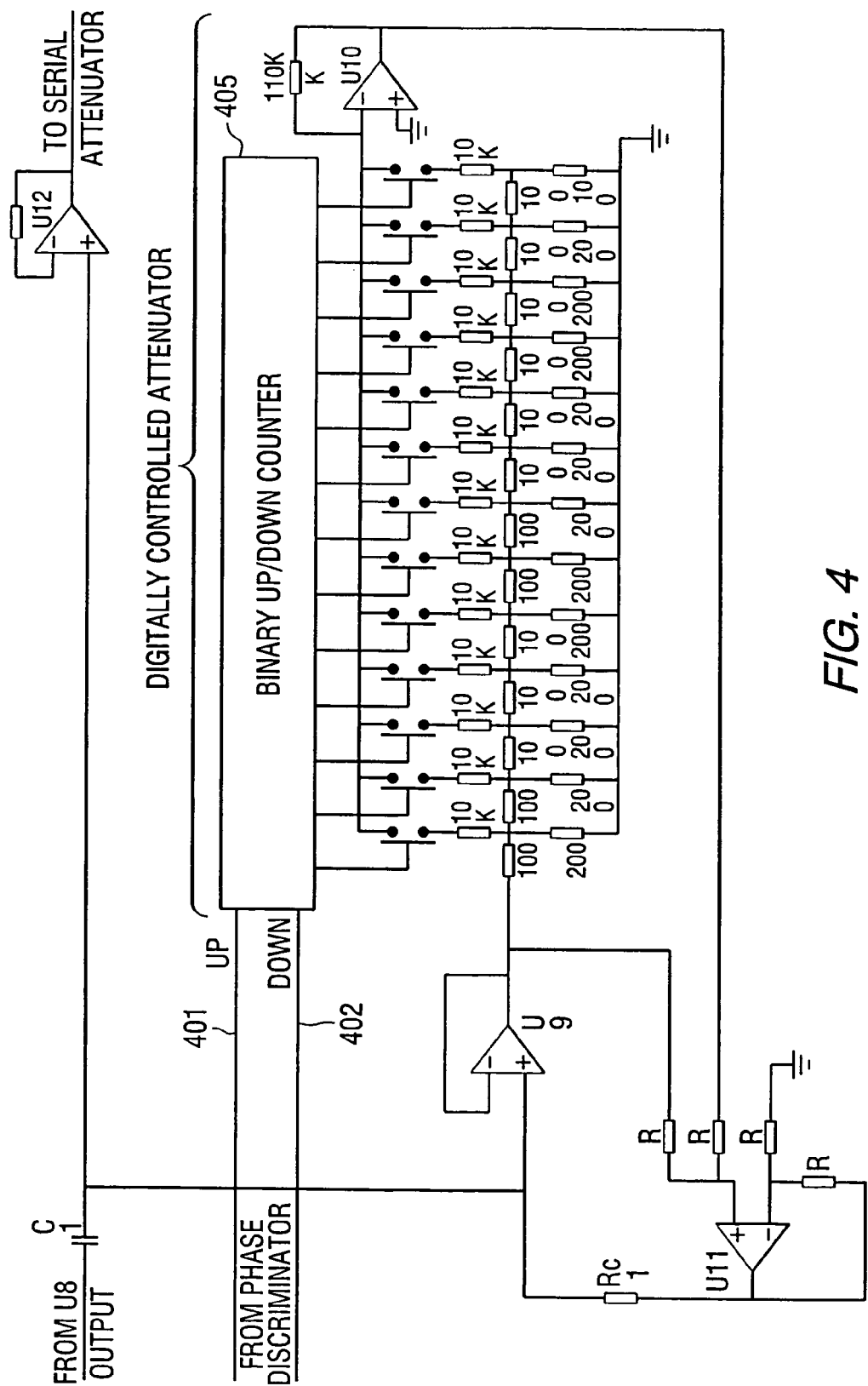
FIG. 4 is a schematic of a digital phase shift control circuit.

The Digital Attenuator 300, as shown in FIG. 3, comprises an R/2R ladder network which sets the voltages at twelve points along the network. The signal level at each of these points is half the signal level at the preceding point. If all the CMOS switches are in the on condition, that is, conducting, then all the voltages will all be presented at the output via the 200 KΩ resistors and summed at the inverting input of U8. If, on the other hand, all the CMOS switches are off, then no voltage will be presented to the inverting input to U8. By switching voltage points in and out of circuit, a summed voltage between VIn and zero can be connected to the inverting input of U8, in steps of a size that is proportional to the incoming voltage divided by the number of count outputs from the digital counter, varying the feedback through the circuit.

The CMOS switches are controlled, in this example, by a 12 bit, pre-settable up/down counter, the LSB being connected to the CMOS switch associated with point 12 and the MSB being equivalently connected to point 1. An up count will therefore increase the voltage found at the inverting input of U8, effectively increasing the amount of feedback and decreasing the output of U8. The direction of count is set by the Control Circuit 500 (FIG. 5) and is determined by the relative signal voltages found at points A and B. If point A signal voltage is lower than point B, then the Control Circuit 500 will detect this and cause the counter to count down, in turn causing the gain of U8 to increase, increasing the signal voltage at point A until it matches that at point B. (At signal voltage match, the counter clock is disabled)

For the purpose of correcting the phase response of the line and returning it to zero over the spectrum of interest, a circuit which will vary the phase of the signal in a predictable manner is necessary. In the absence of a simple method of creating an accurate digital capacitor, it was decided to invent a circuit that would vary the phase of the signal in a predictable manner, rather than to create a variable capacitor, per se.

The circuit in FIG. 4 achieves this controlled and predictable phase change by using a fixed capacitance and an electronically variable resistor as a shunt to a virtual earth (ground). This circuit is capable of varying Rc1, the electronically variable resistor from infinity to a few tens of ohms, allowing phase shifts of from zero degrees to almost 90 degrees.

This is achieved in the following manner: Signals from U8 output pass through C1 and develop over Rc1. These signals are buffered by U9 and presented to the non inverting input of U11, a unity gain non inverting mixer. Without the action of U10, it follows that, since the voltage on both ends of Rc1 is equal in all respects, RC1 will present an effective infinite impedance to signals arriving via C1. Under these circumstances, the reactance of C1, compared to the effectively infinite impedance of Rc1 and the very high input impedance of U12, will be negligible and the phase of the signal traversing the circuit will not be changed.

The output of buffer U9 is also connected to the input of the digitally controlled amplifier, whose gain can be varied in the same manner that the digitally controlled attenuator is controlled, by the clock pulses received by the binary up/down counter, which are in turn controlled by the phase discriminator and associated window discriminator and clock switching circuitry in the control circuitry. This controls the output of U10 between an inverting gain of zero to an inverting gain of 10. As the gain of U10 increases, the apparent resistance of Rc1 decreases, since the output of U10 is being presented to the non line end in anti-phase to the incoming signal. Thus impedance of Rc1, as perceived by incoming signals, can be varied from effective infinity to one tenth of the actual value of Rc1. It follows that the phase shift across the circuit will increase as the value of Rc1 decreases and therefore the phase shift of the circuit is controlled by the controlling clock inputs from the control circuitry.

The presets on the counters are set to provide a match for the nominal line impedance for the lines to which the junction is connected. This will vary from country to country and sometimes from operator to operator.

Control Circuitry

It can be seen in FIG. 5 that samples of signal are taken from both Point A and Point B and that the clock and up/down controls also enter the diagram from the right hand side. Referring to FIG. 5, below, the use and origin of these signals is described. In this example, 80 Hz and 24 KHz tone signals are filtered from the sample signals and presented to the following control stages where they are compared, the 24 KHz tone being both phase and amplitude compared while the 80 Hz tone is only amplitude compared.

Taking the phase comparison first, which is used to set the phase shift of the digital phase shift circuit; the higher frequency tones from points A and B are filtered by filters 501, 502 and are used as the inputs to a phase comparator 510. The sensitivity of the phase comparator 510 is sufficient to provide a voltage which will trigger the window discriminator 516 should the phase of the signal at Point A differ from that at Point B by a predetermined amount.

If the integrated signal from the phase comparator is large enough, in either the positive or negative direction, to fall outside the window, then the window discriminator 516 output will close one of the switches 523, 524 which will connect the clock 540 to either the up or the down count input 401, 402 of the counter 405 associated with the Phase Shift Circuit 400. The direction of count is always such that the phase difference between Points A and B tends toward zero. If the integrated signal from the phase discriminator 510 is small enough to fall within the window, then neither switch 523, 524 will be closed, the clock 540 will not be connected to the counter and the counter 405 will remain locked.

Thus, the circuit 500 detects if the signal at Point A is lagging or leading the signal at Point B, causes the counter 405 to adjust the phase shift until a phase balance is achieved, and then cuts off the clock to the 12 bit counter 405, freezing the hybrid circuit 200 in the balanced position.

The higher frequency tones from the filters 501, 502 and RMS to DC converters 505. 506 are also connected to a voltage comparator 512. If the amplitude of the tone at Point A is either larger or smaller than that at Point B, an output will be present at the output of this comparator 512. At an exact match, there will be no output, although this is unlikely to be achieved in the real world. This output is connected to the input of a window discriminator 514, which will provide an output to one of two switches 521, 522 which will connect the clock 540 to either the up or down count input of the counter 305 associated with the digital attenuator 300 which is in series with the phase controller 500 in the compensation circuit. Again, the direction of count is always such that the differences between Points A and B tend toward zero. The low frequency tone from Points A and B is detected by filters 503, 504 and managed in exactly the same manner as the higher frequency tone and is used to control the value of Attenuator 1.

As can be seen from the circuitry, the response time of Attenuator 1 is deliberately set, in this example, 300 times slower than that of Attenuator 2 or the digital phase shift controller by a divide by 300 circuit 530. Effectively, changes in Attenuator 1 which have an effect on the overall circuit response, will be compensated for by the elements controlled by the higher frequency tone as though they were caused by changes in line impedance, which may be equally slow, or slower.

It can be seen from the above that the three element Line Compensation Network 30, FIG. 2, is controlled by the levels of both tones and by the phase of the higher frequency tone. In each case the changes in the elements is such that the differences between Points A and B tend toward zero. Once all three elements are fully adjusted, and the Control Circuit 500 has ceased to produce a clock signal, this condition may be detected and the Control Circuit 500 disconnected from the hybrid and balun section.

By multiplexing the Control Circuit 500 and using it at initial turn on to balance each connectable hybrid/balun on a DSLAM line card, for example, it may be used to manage as many Hybrid sections 200 as may be installed on a card. Thus, on a DSLAM line card with 16 line ports, the Control Section would be multiplexed to the required 16 hybrid/balun sections.

Receive Operation

Turning back to FIG. 2, signals received from the line, which will cover both speech and ADSL spectrums, will develop over R21 and R22, be amplified by U7, which in this case acts as a differential amplifier, again amplified by U8 and be connected, via Point A, to the inverting input of U2. Since there is no equivalent signal at Point B, this signal will be amplified by U2 and becomes the 4 wire output signal.

This line signal will also develop over the resistor string R6 to R3, and that portion of it which develops over R5 and R4 will be amplified by U3. This signal will be fed back, in phase with the incoming line signal, to the outputs of U5 and U4. The outputs of these amplifiers are connected to the non-line ends of R21 and R22 respectively. These signals, being in phase with the incoming line signals, will effectively raise the resistance of R15 and R16 as perceived by the line signal.

Since the line compensation network 30 sets the level of signal at each frequency throughout the spectrum, it follows that the fed back signals at the non line ends of R15 and R16 will be at different levels at different frequencies, following the compensation curve, which accurately reflects the line impedance at each relevant frequency. This will cause the perceived impedance of R21 and R22 to closely match the line impedance at all received frequencies. This includes both speech frequency and broadband frequencies. This will greatly increase the return loss at the line junction and allow the same hybrid to be used over the entire speech and ADSL frequency range.

Common Mode Rejection at the Hybrid/Balun

Common mode signals arriving from the line 64 will be limited in amplitude by the Common Mode Voltage Controller 100 part of the overall circuit. The Hybrid/Balun also presents a high common mode impedance to the line 64 in order to allow the correct operation of the Common Mode voltage Controller portion of the overall circuit and to increase the common mode rejection ratio of the Hybrid/Balun 200.

The output of U5 in the CMVC 100 provides an isolated common mode signal to the Hybrid/balun 200 for use in the common mode cancellation circuitry via point "C". The isolated common mode signal 210 is connected, via R32 and R33, to the inverting and non inverting inputs of U7, respectively. These signals will be of equal amplitude and in anti-phase to the common mode signals present on the line. Since the values of resistors R26, R27, R32 and R33 are equal, the common mode signals will cancel at U7's inputs. U7 is an amplifier with a high common mode rejection ratio, so the amount of common mode signal presented to the circuitry at the output of U7 will be effectively zero.

At the same time, and in order to provide a high impedance at the balun input to common mode signals, the output of U6 is also connected, via R17 and R19 respectively, to the inverting inputs of U4 and U5. U4 and U5 are unity gain amplifiers so the common mode derived signals appearing at their outputs will be at the same amplitude and in phase with the common mode signals on the line.

Since the common mode signals on both end of both R21 and of R22 are identical, no common mode current can flow in these resistors and their resistance, with regard to common mode signals on the line, will appear effectively infinite, thereby preventing common mode interference with the performance of U4 and U5 and allowing correct operation of the Common Mode Voltage Controller.

The common mode amplitude limiting action of the Common Mode Voltage Controller 100 part of the overall circuitry is set such that the combination of the common mode voltage and wanted transmit signal voltage applied to the inputs of U4 and U5 does not exceed the capabilities of these amplifiers to prevent clipping of the wanted signal.

Receive Signal Filtering

Since the circuit 200 is capable of matching line impedance and providing high trans-hybrid loss from low speech frequency to high broadband frequencies, it can accept both speech frequency signals and broadband signals. If separate speech frequency equipment, for example telephone instruments or a telephone exchange, are attached to the output of U2, the four wire output 220, the speech and broadband signals must be separated at this point. Two simple, active filters 221, 222, without inductive components, provide this function at the output of U2.

Those skilled in the art understand that the CMVC described above may be implemented as part of the ABLE or may be separately installed wherever required to improve common mode performance in the communications system. The CMVC and the ABLE are compatible with central telephone office equipment and with customer premises equipment and may be added to each to improve their respective performance. In addition, those skilled in the art understand that the term "two-to-four wire" is used to represent the hybrid circuits that couples central office and customer equipment to conventional two wire twisted pair conductors. In the past, such circuits used four input wires consisting of one twisted pair of transmit and another for receive. Such equipment still exists, but modern equipment may use coaxial cable for the transmit and receive connections. As such, there are not four wires but only two for transmit and receive. However, the problem of impedance matching remains regardless of the use of twisted pair or coaxial cable for the transmit and receive lines to customer and telephone service provider equipment. Those skilled in the art also understand that the functions of analog devices described herein may be achieved by digital logic circuits, microprocessors and/or digital signal processors.

The invention claimed is:

1. A method of filtering signals carried by a twisted pair of wires, the twisted pair including a first wire and a second wire, the twisted pair carrying a wanted differential signal and an unwanted common mode signal, the method comprising:

providing a first impedance element having first and second terminals;

providing a second impedance element having first and second terminals;

coupling the first wire to the first terminal of the first impedance element;

coupling the second wire to the first terminal of the second impedance element;

generating in response to the signals in the twisted pair a first impedance controlling signal and coupling the first impedance controlling signal to the second terminal of the first impedance element, the first impedance controlling signal including a first component and a second component, the first component of the first impedance controlling signal being substantially equal to the portion of the differential signal carried by the first wire, the second component of the first impedance controlling signal being generated in response to the common mode signal carried by the twisted pair, the first impedance element thereby presenting the portion of the differential signal carried by the first wire with a first impedance and presenting the portion of the common mode signal carried by the first wire with a second impedance, the first impedance being greater than the second impedance; and generating in response to the signals in the twisted pair a second impedance controlling signal and coupling the second impedance controlling signal to the second terminal of the second impedance element, the second impedance controlling signal including a first component and a second component, the first component of the second impedance controlling signal being substantially equal to the portion of the differential signal carried by the second wire, the second component of the second impedance controlling signal being generated in response to the common mode signal carried by the twisted pair, the second impedance element thereby presenting the portion of the differential signal carried by the second wire with a third impedance and presenting the portion of the common mode signal carried by the second wire with a fourth impedance, the third impedance being greater than the fourth impedance.

2. The method of claim 1, the first impedance being substantially equal to the third impedance, the second impedance being substantially equal to the fourth impedance.

* * * * *